United States Patent [19]

Seo

[11] Patent Number: 5,736,024
[45] Date of Patent: Apr. 7, 1998

[54] METHOD FOR REMOVING HEAVY METAL IONS DISSOLVED IN A SOLUTION

[75] Inventor: Hirofumi Seo, Tokyo, Japan

[73] Assignee: NEC Corporation, Tokyo, Japan

[21] Appl. No.: 826,151

[22] Filed: Mar. 27, 1997

Related U.S. Application Data

[63] Continuation of Ser. No. 531,870, Sep. 21, 1995, abandoned.

[30] Foreign Application Priority Data

Sep. 28, 1994 [JP] Japan .................. 6-232898

[51] Int. Cl.⁶ .................................................. B03C 5/00
[52] U.S. Cl. .................. 204/554; 204/571; 205/750; 210/748; 210/912
[58] Field of Search .................. 204/554, 571, 204/670, 671; 205/750; 210/748, 912

[56] References Cited

U.S. PATENT DOCUMENTS

| | | | |
|---|---|---|---|
| 3,732,919 | 5/1973 | Wilson | 165/110 |
| 4,206,020 | 6/1980 | Backhurst et al. | 204/59 R |
| 4,242,185 | 12/1980 | McRae | 204/98 |
| 4,439,296 | 3/1984 | Swarup | 204/253 |
| 4,461,347 | 7/1984 | Layton et al. | |
| 4,790,914 | 12/1988 | Sorenson | 204/98 |
| 5,164,091 | 11/1992 | Huber et al. | 210/638 |

FOREIGN PATENT DOCUMENTS

| | | |
|---|---|---|
| 4222870 | 1/1994 | Germany . |
| 4-286328 | 10/1992 | Japan . |

OTHER PUBLICATIONS

"Koubunshi Zairyo no Kagaku," by Shouhei Inoue et al., Chemistry of Polymeric Materials, Maruzen Co., Ltd., 1972, pp. 193-200 No month available.

"Device Degradation by Metallic Impurities and a New Cleaning Solution for Metallic Impurities," by Tsugio Shimono et al., Ultra Clean Technology, vol. 3, 1991, pp. 244-249 No month available.

A. Kenneth Graham, Electroplating Engineering Handbook, 2nd edition, Reinhold Publishing Corp., New York, 1962, pp. 540-541 No month available.

*Primary Examiner*—Kathryn L. Gorgos
*Assistant Examiner*—William T. Leader
*Attorney, Agent, or Firm*—Foley & Lardner

[57] ABSTRACT

A method and apparatus for separating heavy metal ions from a processing solution includes a filter. A cylindrical separating member divides the filter into two discrete compartments, an inner cylindrical portion and an outer annular portion concentrically arranged outside the inner cylindrical portion. The separating member is made of chemical and heat resistant material. The processing solution is made to flow through the inner portion in one direction and a gas is made to flow through the outer portion in the opposite direction. The flowing has negatively charges the separating member, which results in formation of an electrical double layer on the surface where the processing solution contacts the separating member. The heavy metal ions in the processing solution, which ions are positively charged, are attracted and adsorbed to the negatively charged separating member, thus removing the heavy metal ions from the processing solution.

9 Claims, 9 Drawing Sheets

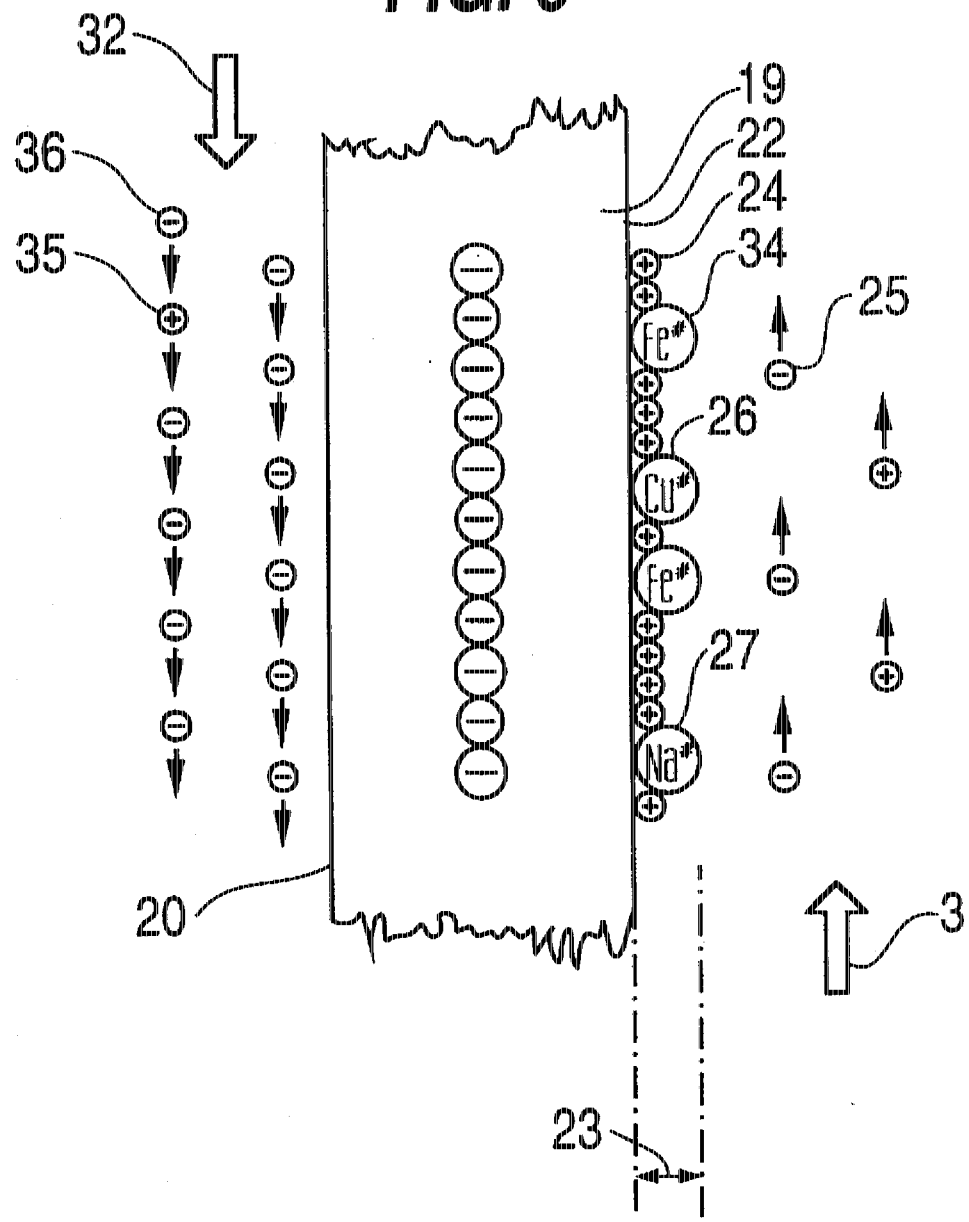

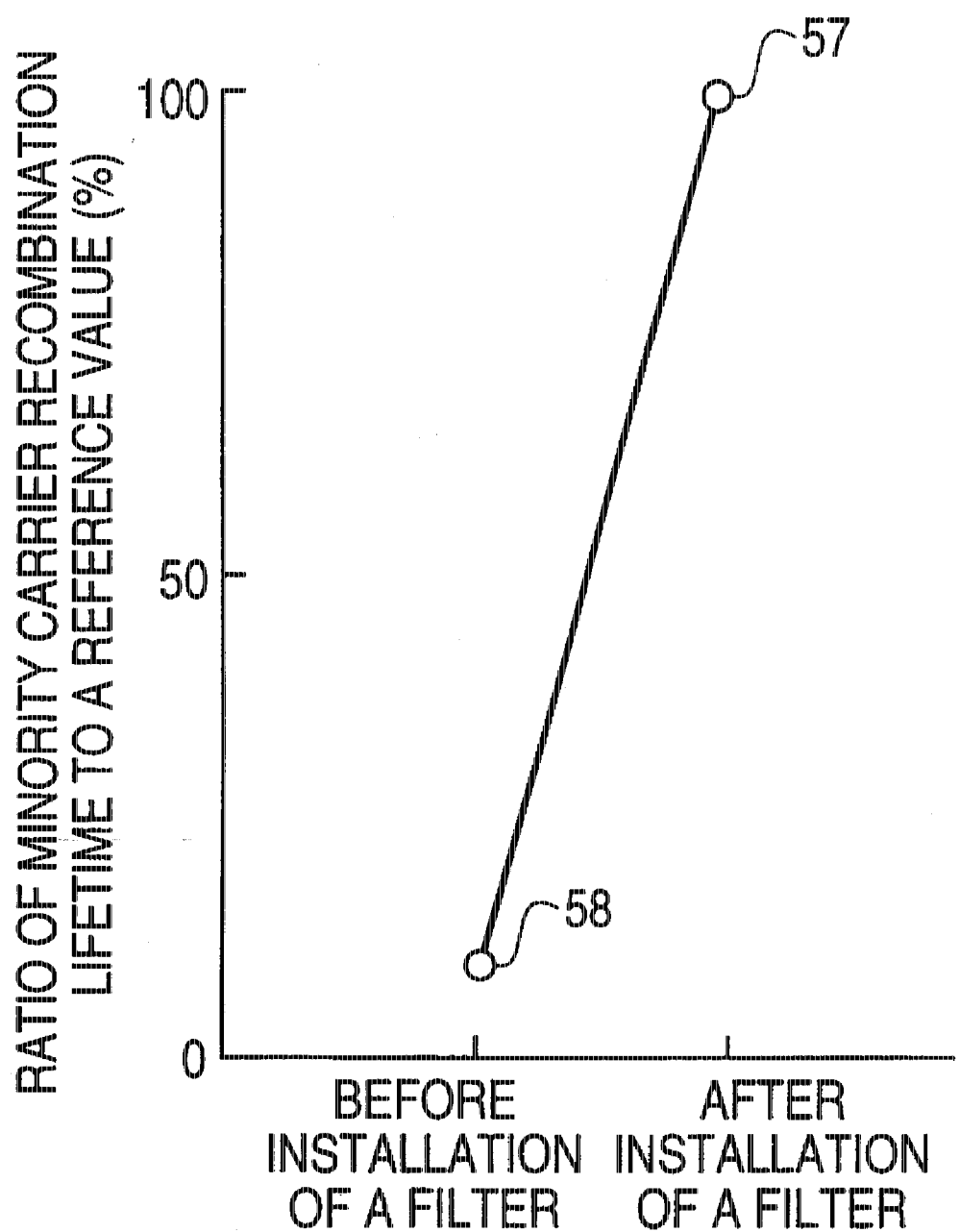

METHOD FOR REMOVING HEAVY METAL IONS DISSOLVED IN A SOLUTION

This application is a continuation of application Ser. No. 08/531,870, filed Sep. 21, 1995, now abandoned.

BACKGROUND OF THE INVENTION

1. Field of the Invention

The present invention relates to a wet chemical processing of semiconductor wafers in a semiconductor manufacturing process, and more particularly, it relates to a filter for removing heavy metal ions from a processing solution.

2. Description of the Related Art

In a filter for removing heavy metal ions from a wet chemical processing solution for semiconductor wafers in a conventional semiconductor manufacturing process, as shown in FIG. 1, a filter container 50 is filled with silicon particles 51 that can easily adsorb the heavy metal ions (such as Cu ion) dissolved in hydrofluoric acid (hereinafter referred to as "HF acid") 56 (e.g., see Japanese Patent Application Laid-open No. 286328/1992).

FIG. 2 shows variation of the amounts of Cu adsorbed on active silicon surfaces (hereinafter referred to as "the Si surfaces"), on silicon oxide film surfaces (hereinafter referred to as "the $SiO_2$ surfaces") and on silicon nitride film surfaces (hereinafter referred to as "the $Si_3N_4$ surfaces") in HF acid 56, when a Cu concentration is changed. FIG. 2 indicates that as the Cu concentration in HF acid 56 is increased, the Cu adsorption 54 on the Si surfaces increases more than that of the $SiO_2$ surfaces(52) or the $Si_3N_4$ surfaces (53). The Si surfaces can, therefore, adsorb Cu more effectively than any other film surfaces. Furthermore, if the Si surfaces are activated by sputtering with Ar ions, Cu adsorption further increases, giving the adsorption curve 55.

Thus, Si particles effectively adsorb to remove the heavy metal ions in HF acid, but disadvantageously they cannot remove heavy metal ions dissolved in solutions (e.g., aqueous ammonia or hydrogen sulfide water) except HF acid used in a wet chemical processing of semiconductor wafers in a semiconductor manufacturing process.

Next, another conventional technique will be described.

As an example of separating materials adsorbing to remove heavy metal ions dissolved in a solution, there is an ion exchange resin (e.g., a cation exchange resin or a chelating resin) (see, Shouhei Inoue and Seizou Miyata, "Koubunshi Zairyo no Kagaku (Chemistry of Polymeric Materials)", p. 193–200).

In the first place, the cation exchange resin will be described.

The following is a structural formula of a highly acidic cation exchange resin ($R$—$SO_3H$) having $SO_3H$ groups, which is one of cation exchange resins used in a super-pure water manufacturing system:

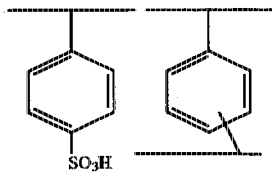

For example, this highly acidic cation exchange resin can separate Na ions dissolved in water with an ion exchange reaction represented by the following formula (1), although all the metal ions cannot be separated as are Na ions, that is, separation efficiency depends upon the heavy metal ion to be removed.

$$R\text{---}SO_3H + NaOH \rightarrow R\text{---}SO_3Na + H_2O \qquad (1)$$

When a pH value of the solution is high (e.g., aqueous ammonia), ionization of ion exchange groups is inhibited, so that the ion exchange is impeded. In addition, there is also a drawback that as shown by formulae (2) and (3), $H_2O$ chemically decomposes the functional groups of the resin to elute acid components from the resin. Furthermore, when the temperature of the solution is high, the resin may be subject to a similar structural decomposition, so that acid components are eluted from the resin:

$$R\text{---}SO_3H \xrightarrow{H_2O} R\text{---}H + H_2O + H_2SO_4 \qquad (2)$$

$$R\text{---}SO_3H \xrightarrow{H_2O} R\text{---}OH + H_2SO_3 \qquad (3)$$

Next, another ion exchange resin, an iminodiacetic acid type chelating resin, which is one of the chelating resins for capturing the heavy metal ions by forming a chelate bond will be described.

The following is a structural formula of the iminodiacetic acid type chelating resin:

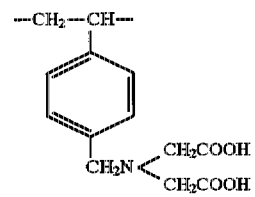

FIG. 3 shows the variation of the amount of Cu ions separated by the iminodiacetic acid type chelating resin, while the amount of a solution containing 100 ppm of Cu ion varies.

As indicated in FIG. 3, this chelating resin can separate 100% of Cu ions when the volume of the solution is about 120 $dm^3$ less per $dm^3$ of the resin, but when the volume exceeds it, Cu ions cannot be completely separated, so that the leakage of Cu ions inconveniently increases.

Furthermore, it is well known that the separability of this resin depends upon the pH of the solution used, i.e., when the solution is highly alkaline, its separability significantly deteriorates. In addition, if the temperature of the solution is high, the structure of the chelating resin breaks down as in the case of the cation exchange resin, so that the resin loses its ability to exchange heavy metal ions and also chemical species are eluted from the resin.

The technique described in the above-mentioned Japanese Patent Application Laid-open No. 286328/1992 can be applied only to HF acid used in the wet chemical processing to remove $SiO_2$ films formed on the surfaces of semiconductor wafers, one of the stages in a semiconductor manufacturing process. Therefore, the disclosed technique is not useful in solutions other than HF solution.

When a separating member of a filter is an ion exchange resin, the ability of the resin to adsorb heavy metal ions depends upon pH and volume of the solution. For this reason, the ion exchange resin can be applied only to the solution compatible to its properties. Furthermore, there are disadvantages such as contamination by reaction products of the ion exchange resin with the solution, or chemical species eluted from the ion exchange resin itself due to its poor heat resistance.

As a result, since most of the solutions for the wet chemical processing of semiconductor wafers are used without removal of the heavy metal ions, it is inevitable that the solutions are contaminated by heavy metal ions. Ultimately, these heavy metal ions are adsorbed on the semiconductor wafers during the processing, so that the semiconductors may be defective.

SUMMARY OF THE INVENTION

The present invention has been made to overcome the above-mentioned problems, and an object of the present invention is to provide a filter that is applicable to any solution used in a wet chemical processing of semiconductor wafers and that can remove heavy metal ions contained in the solution to eliminate defects in a semiconductor device caused by adhesion of heavy metals to the device.

The present invention directed to a filter which is installed in a solution feeding system connected to a processing tank for subjecting semiconductor wafers to a wet chemical processing, and which filter removes heavy metal ions dissolved in a solution prior to the wet chemical processing, characterized by that the interior of a filter container of the filter is divided into two sealed portions by a cylindrical heavy-metal ion separating member comprising a chemical-resistant and heat-resistant material, the processing solution flows through an inner cylindrical portion of the separating member, and a fluid for negatively charging the separating member flows through an annular portion between the outer periphery of the separating member and the wall of the filter container.

In the present invention, as the fluid for charging the separating member, there can be used a gas such as nitrogen, dry air, argon or helium, or a gas rich in negative ions, i.e., a negative-ion rich gas.

Furthermore, preferable materials for the separating member include fluororesins such as polytetrafluoroethylene, tetrafluoroethylene-perfluoroalkylvinyl ether copolymer, tetrafluoroethylene-hexafluoropropylene copolymer, tetrafluoroethylene-ethylene copolymer, polyvinylidene fluoride and polychlorotrifluoroethylene.

BRIEF DESCRIPTION OF THE DRAWINGS

FIG. 9 is a conceptual view illustrating an interface phenomenon during feeding the negative-ion rich gas to the separating member.

FIG. 10 is a graph illustrating a ratio of a recombination lifetime of minority carriers on the semiconductor wafer to a reference value in a solution processing process when the filter of the present invention is used and that when it is not used.

DETAILED DESCRIPTION OF THE INVENTION

A filter of the present invention is equipped with a filter container; a separating member dividing the filter container into two sealed chambers, which attracts to remove heavy metal ions in a solution and which comprises materials excellent in chemical resistance and heat resistance; a solution inlet through which the solution containing the heavy metal ions to be removed is introduced from the outside of the filter container into an inner cylindrical portion of the separating member which is one of the two sealed chambers; a solution outlet through which the solution in the filter container is discharged; a gas inlet through which a gas for negatively charging the separating member is introduced from the outside of the filter container into an outer annular portion of the separating member which is the other of the two sealed chambers; a gas outlet through which the introduced gas is discharged; and means for feeding the gas for negatively charging the separating member to the gas outlet.

Separation of the heavy metal ions by virtue of a filter of the present invention will be described.

When the gas for negatively charging the separating member is introduced through the gas inlet, the separating member is negatively charged by friction between the separating member as a solid phase and the gas as a mobile phase.

On the other hand, when the solution containing the heavy metal ions is introduced through the solution inlet into the filter container, the solution as a liquid phase moves, keeping contact with the separating member as a solid phase, so that an electrokinetic phenomenon occurs to form an electric double layer on a solid phase-solution interface.

Then, positively charged chemical species in the vicinity of the solid phase-solution interface in the solution are attracted by the separating member.

That is to say, since heavy metals (e.g., Fe, Cu, Cr and Ni) are dissolved as positive ions, they are trapped on the solid phase-solution interface of the separating member.

In the following examples, a filter of the present invention and a method for processing a solution by the use of the filter will be detailed with reference to attached drawings.

EXAMPLE 1

Figure 1:
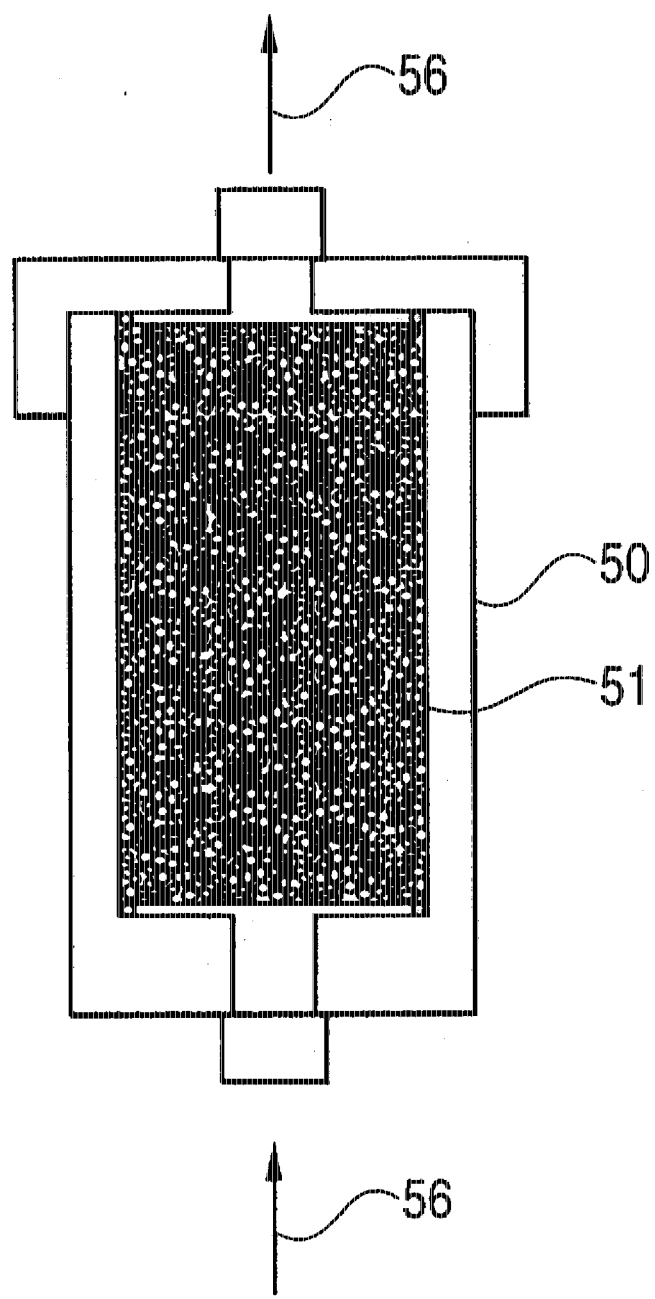
FIG. 1 is a schematic sectional view illustrating the constitution of a conventional filter.
Figure 2:
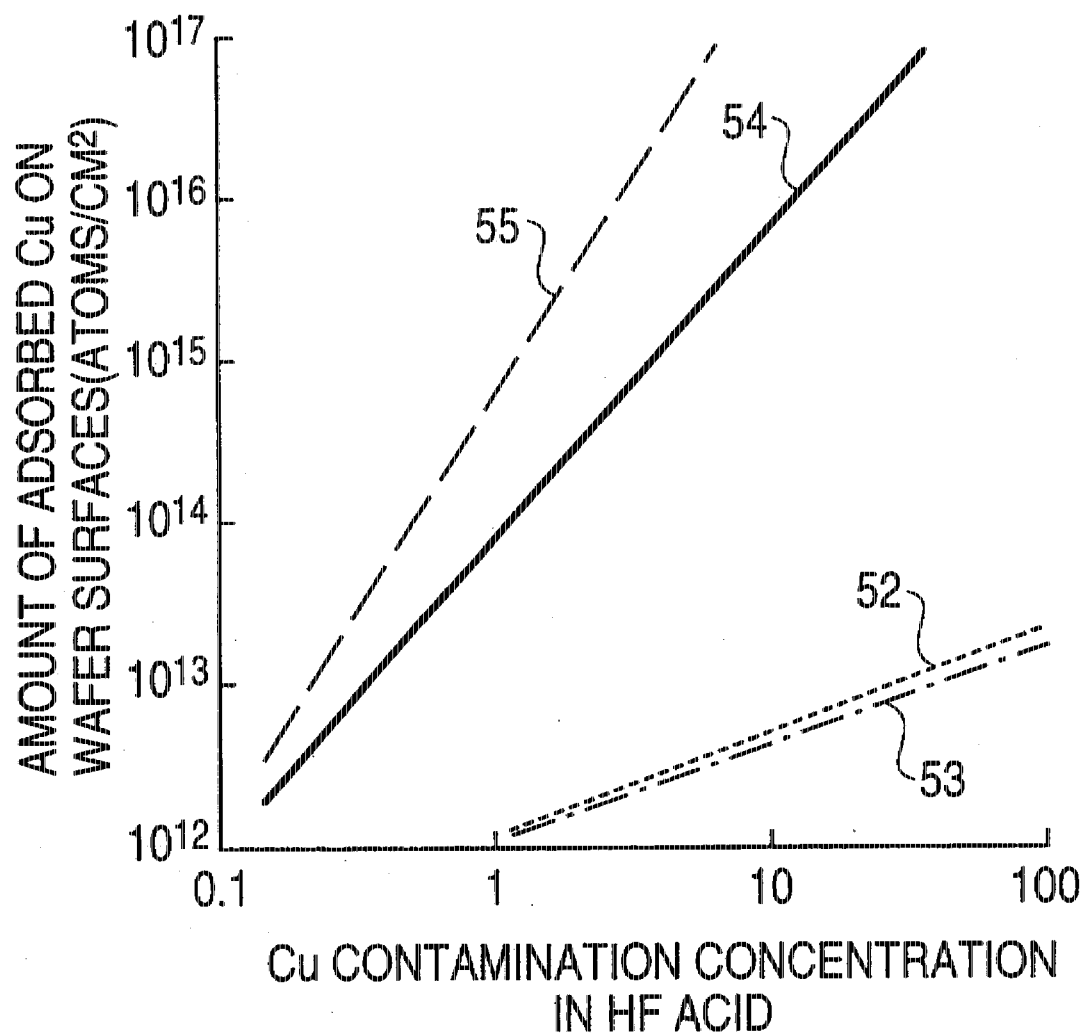
FIG. 2 is a graph showing the correlation between a Cu concentration in HF acid and the amount of Cu adhering to the surfaces of wafers.
Figure 3:
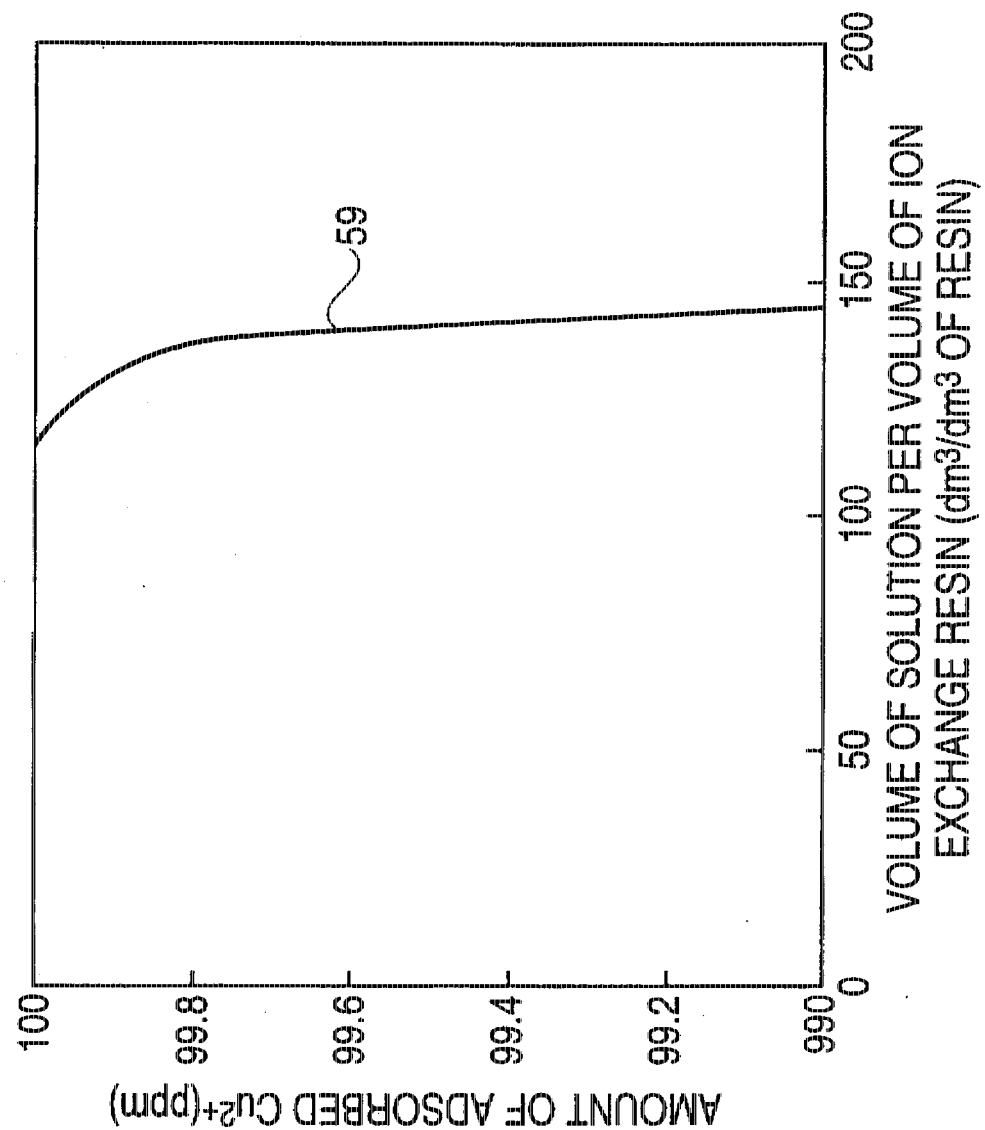
FIG. 3 is a graph illustrating the correlation between the amount of a processing solution and the amount of Cu adsorbed for a volume of an ion exchange resin.
Figure 4:
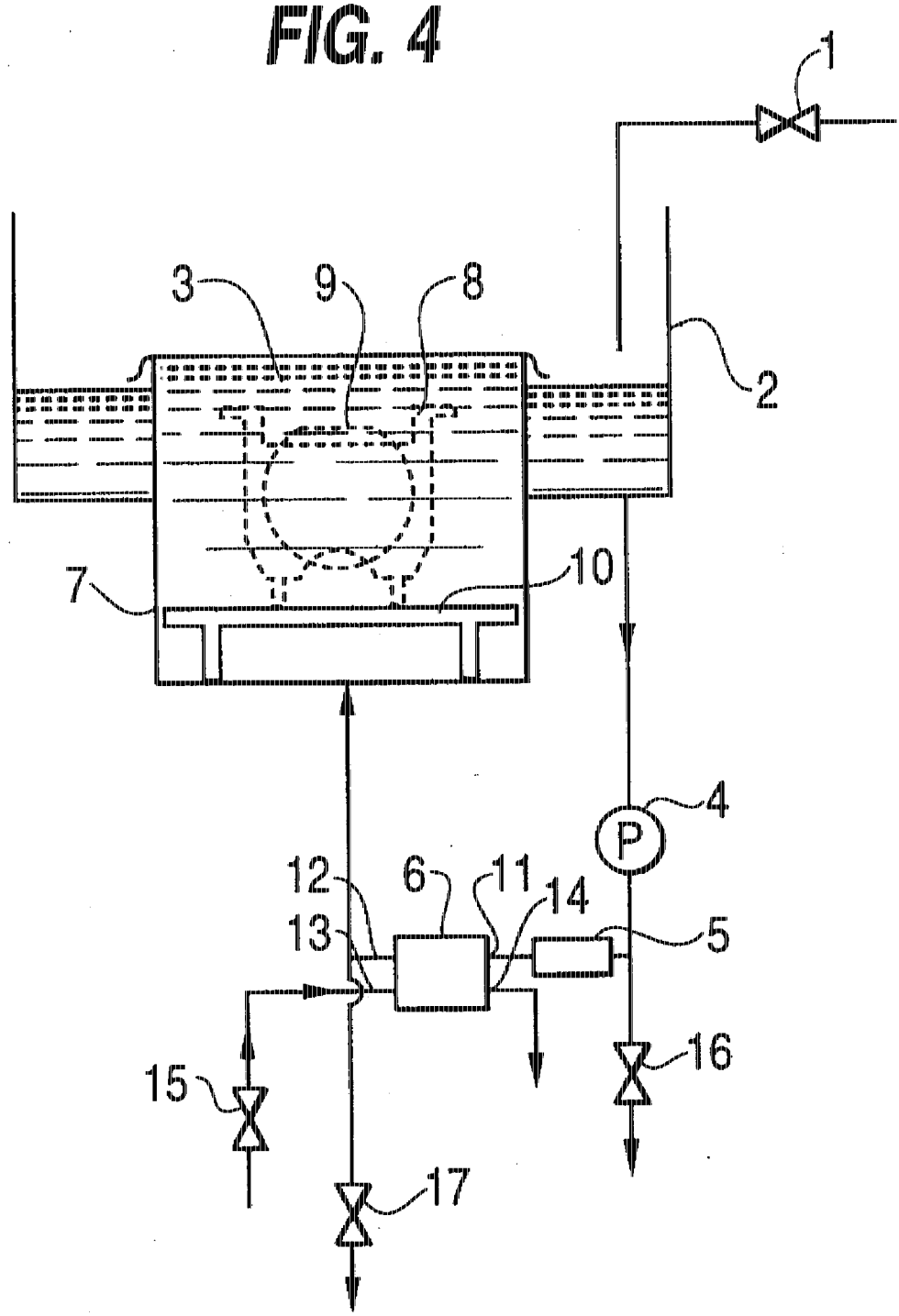
FIG. 4 is a schematic view illustrating an example of the constitution of a solution circulating type heavy metal ion separating processing apparatus having a filter of the present invention.

FIG. 4 is a view showing an example of a solution circulating type heavy-metal-ion separating apparatus equipped with a filter according to the present invention. A processing solution feed valve 1 controls the feed of a processing solution 3 to an outer tank 2, and a pump 4 feeds the processing solution 3 in the outer tank 2 to an inner tank 7 through a particle removing filter 5 and a filter 6. This outer tank 2 is a tank for storing the processing solution 3 overflowing from the inner tank 7. The particle removing filter 5 and the filter 6 remove the particles and the heavy metal ions in the processing solution 3 forwarded by the pump 4, respectively.

In the inner tank 7, semiconductor wafers 9 placed in a carrier 8 are subjected to a wet chemical processing with the processing solution 3, and a carrier supporting table 10 fixes the carrier 8 in the inner tank 7. A processing solution inlet 11 is an inlet through which the processing solution 3 is fed to the filter 6, and a processing solution outlet 12 is an outlet through which the processing solution 3, from which heavy metal ions have been removed in the filter, is discharged outside from the filter 6. A gas inlet 13 is a feeding inlet through which a gas for making the filter 6 capable of attracting heavy metal ions is fed to the filter 6, and a gas outlet 14 is a gas outlet through which the gas fed through the gas inlet 13 to the filter 6 is discharged outside from the filter 6.

Furthermore, a gas feeding valve 15 is a valve for feeding the gas to the gas inlet 13 of the filter 6, and an outer tank solution discharge valve 16 and an inner tank solution discharge valve 17 control the discharge of the processing solution 3 from the outer tank 2 and the inner tank 7, respectively.

By closing the inner tank solution discharge valve 17 and the outer tank solution discharge valve 16, opening the processing solution feeding valve 1, the processing solution 3 is fed to the outer tank 2. The processing solution 3 stored in the outer tank 2 is fed to the processing solution inlet 11 of the filter 6 through the particle removing filter 5 by the pump 4. At this time, the gas feeding valve 15 is opened, so that the gas flows from the gas inlet 13 to the gas outlet 14. The heavy metal ions are removed from the processing solution 3 by the filter 6, and the heavy-metal-ion free processing solution 3 is then introduced into the inner tank 7 through the processing solution outlet 12. The processing solution 3 overflowing the inner tank 7 flows into the outer tank 2. In these conditions, the carrier 8 with the semiconductor wafers 9 is placed on the carrier supporting table 10 in the inner tank 7, whereby the wafers 9 are chemically processed with the highly pure processing solution.

Next, the structure of the filter 6 will be described.

Figure 5:
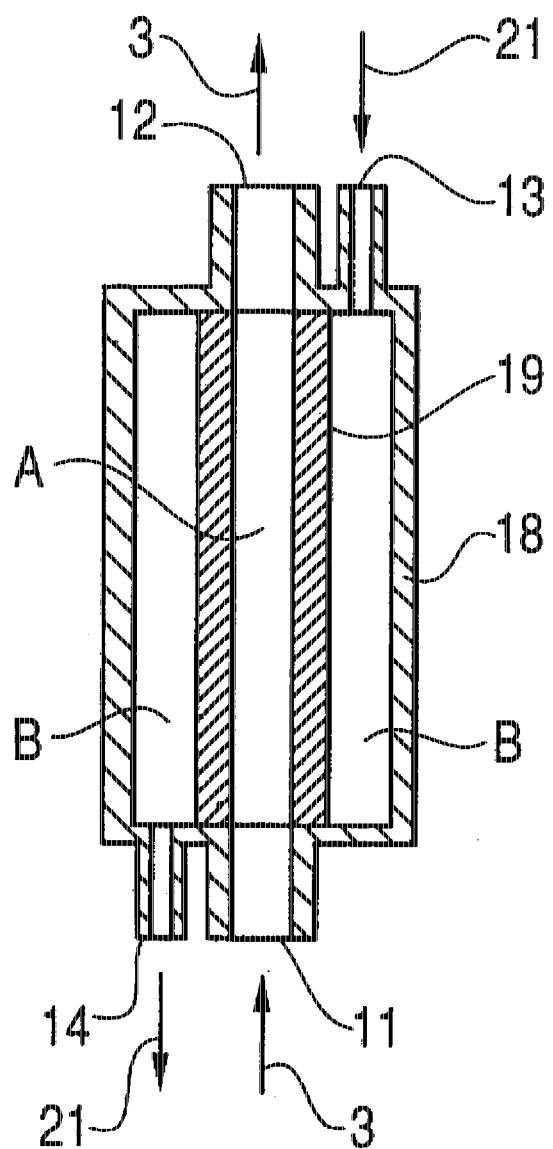
FIG. 5 is a schematic sectional view illustrating an example of the constitution of a filter of the present invention.

An example of the inner structure of the filter 6 is shown in FIG. 5. In this filter, the interior of a filter container 18 is divided into two sealed chambers, i.e., an inner cylindrical portion A and an outer annular portion B by a separating member 19 for attracting to separate the heavy metal ions. The inner cylindrical portion A has the processing solution inlet 11 and the processing solution outlet 12 through which the processing solution 3 flows. The outer annular portion B has the gas inlet 13 and the gas outlet 14 through which a gas 21 for negatively charging the separating member 19 flows. Here, the separating member 19 comprises materials excellent in chemical resistance and heat resistance [e.g., a fluororesin such as polytetrafluoroethylene (hereinafter referred to as "PTFE") or tetrafluoroethylene-perfluoroalkylvinyl ether copolymer (hereinafter referred to as "PFA")].

The fluororesin is durable and absolutely resistant to liquid or gas permeation, so that the interior of the filter can be securely divided into the inner cylindrical portion A and the outer annular portion B by this separating member. Furthermore, the separating member comprising the resin does not elute chemical species in contrast to a conventional R—SO$_3$H type strong acid cation exchange resin or iminodiacetic acid type chelating resin. In FIG. 5, the processing solution flows through the inner cylindrical portion A and the gas flows through the outer annular portion B, and the solution and the gas flow in a counter flow state. However, the chambers through which the fluids flow and their flowing directions are not limited to those shown in the figure.

Next, a mechanism of attracting the heavy metal ions in the processing solution 3 by the separating member 19 of the filter 6 will be described with reference to FIGS. 6 and 7.

Figure 6:
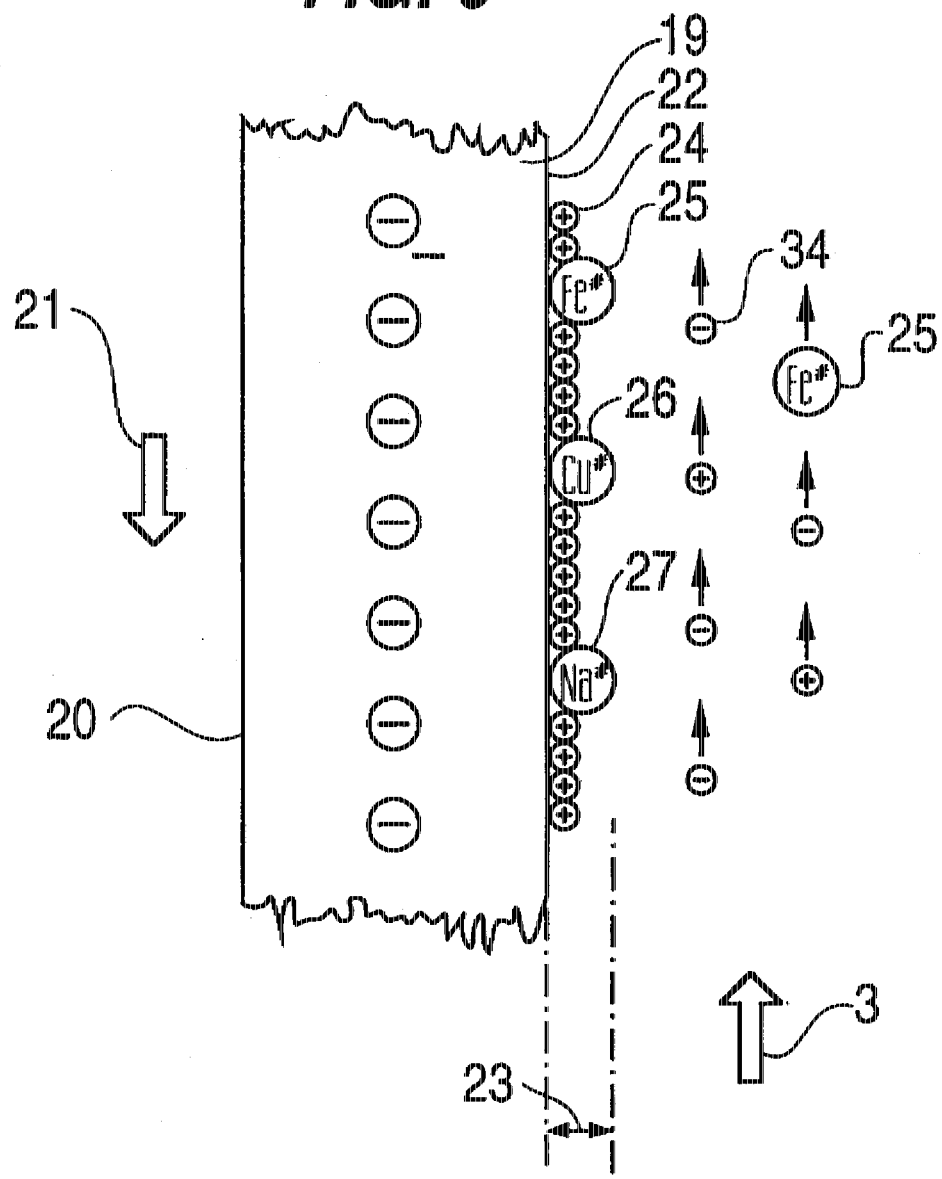
FIG. 6 is a conceptual view illustrating an electrokinetic phenomenon that occurs in the vicinity of the surface of a heavy metal ion separating member.
Figure 7:
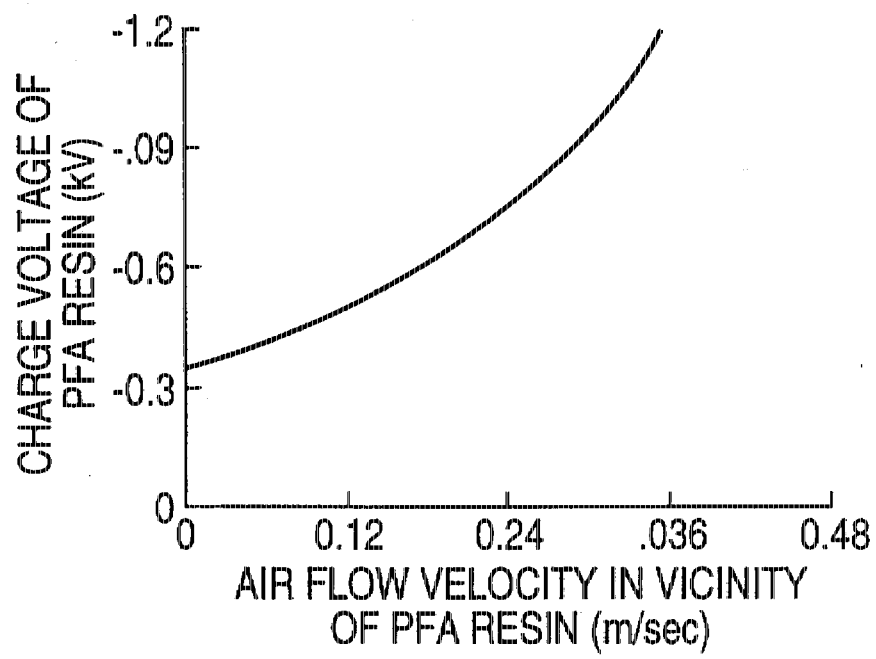
FIG. 7 is a graph illustrating the correlation between a frictional charging voltage and an air flow rate on a contact interface between a PFA resin and air.

FIG. 6 illustrates an electrokinetic phenomenon which occurs in the vicinity of the surface of the separating member 19. On a solid phase-gaseous phase interface 20 of the separating member 19, friction is caused by the movement of the gas 21, so that the separating member 19 is charged. FIG. 7 is a graph illustrating the correlation between an air flow velocity and a frictional charge voltage of the PFA resin in the case that the separating member 19 comprises PFT resin and the gas 21 is air. It is apparent from this graph that a frictional charge voltage of the separating member 19 depends upon the flow velocity of the gas 21, and the higher the flow velocity is, the higher the frictional charge voltage is.

Table 1 shows triboelectric series of various substances summarized by Gilbert and many other researchers on the basis of the polarities generated in two substances after their contact and separation (e.g., G. J. Mackerter, "Erekutoronikusu no Seidenki Taisaku (Control of Static Electricity in Electronics)", McGraw-Hill, Inc., p. 49).

TABLE 1

| | |
|---|---|
| Positive | Air |
| (+) | Human hand |
| | Asbestos |
| | Rabbit's hair |
| | Glass |
| | Mica |
| | Human hair |
| | Nylon |
| | Wool |
| | Fur |
| | Lead |
| | Silk |
| | Aluminum |
| | Paper |
| (±) | Cotton cloth |
| | Steel |
| | Wood |
| | Tree |
| | Amber |
| | Bees wax |
| | Hard rubber |
| | Nickel, Copper |
| | Tin, Silver |
| | Gold, Platinum |
| | Sulfur |
| | Acetate, Rayon |
| | Polyester |
| | Celluloid |
| | Orlon |
| | Polyurethane |
| | Polyethylene |
| | Polypropylene |
| | PVC |
| | KEL F |
| Negative | Silicon |
| (−) | Teflon |

When two of the substances in Table 1 are contacted with and separated from each other, the polarity of the frictional charge voltage of the substance upper in the table is positive and that of the substance lower in the table is negative. For example, when the separating member 19 is made of PFA resin, which is one of Teflons(DuPont) and the gas 21 is air, the separating member 19 can be negatively charged. On the other hand, in FIG. 6, on a solid phase-solution interface 22 of the separating member 19, an electrical double layer 23 is formed by the movement of the processing solution 3. The separating member 19, the solid phase, is negatively charged as described above, and therefore on the solid phase-solution interface 22, the chemical species positively charged in the vicinity of the solid phase-solution interface 22 (e.g., cations 24, Fe ions 25, Cu ions 26 and Na ions 27) are attracted toward the separating member 19, where they are trapped. In other words, since the heavy metal ions (e.g., the Fe ions 25, the Cu ions 26 and the Na ions 27) in the processing solution 3 are positively charged, they are captured by the separating member 19 of the filter 6. The higher the negative charge voltage of the separating member 19, the higher its ability to attract the heavy metals, but once discharge occurs on the solid phase-gaseous phase interface 20, the attraction ability diminishes. Thus, the charge voltage is required to equal or be lower than the breakdown voltage of the gas 21. For example, when the gas 21 is air, the breakdown voltage is 30 kV/cm (at 0° C., 1 atm). Conversely, the chemical species negatively charged in the processing solution 3 (e.g., anions 34) are repelled by the separating member 19.

EXAMPLE 2

Next, an example in which a gas is processed to be negative ion rich before being fed to a filter will be shown.

Figure 8:
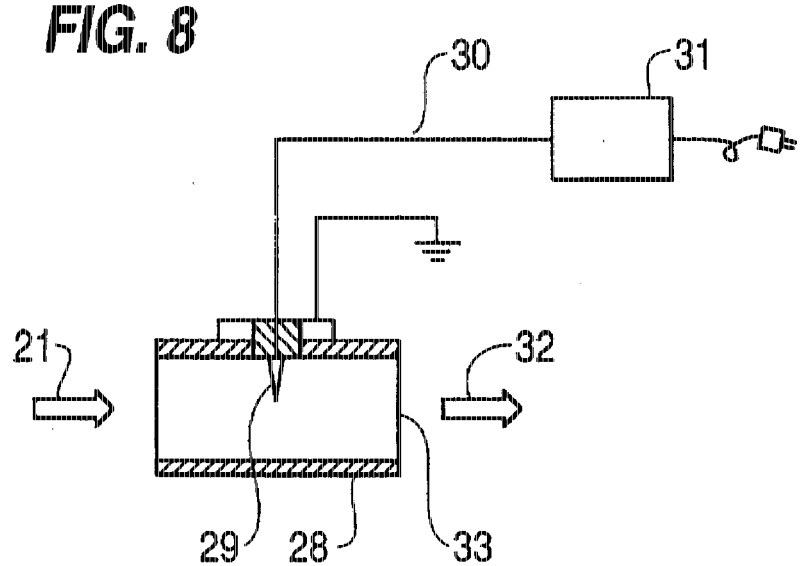
FIG. 8 is a schematic view illustrating the constitution of a high-voltage type ion generator to generate a negative-ion-rich gas fed to the filter.

FIG. 8 is a structural view illustrating an example of a high-voltage type ion generator, by which a gas 21 fed to a gas inlet 13 of a filter 6 is processed to be negative ion rich. This generator comprises a pipe 28 through which the gas 21 flows, a sharply tipped discharge needle 29 placed on the wall of the pipe 28, a voltage applying cable 30 through which a negative voltage is applied to the discharge needle 29, a high-voltage DC power source 31 to generate a predetermined negatively high voltage, and an ion supplying opening 33 through which a negative-ion rich gas 32 is discharged.

While the gas 21 flows through the pipe 28, a DC voltage of $-5$ to $-20$ kV generated by the high-voltage DC power source 31 is applied to the discharge needle 29 through the voltage applying cable 30. As a result, in the vicinity of the tip of the discharge needle 29, insulation by the gas 21 is broken, and consequently cathode corona discharge is induced.

Although molecules of the gas 21 are dissociated by the corona discharge to generate pairs of positive and negative ions since the corona discharge is cathodic, rather more negative ions are generated than the positive ions. Therefore, the gas 21 passing through the discharge needle 29 becomes the negative-ion rich gas 32, and flows out through the ion supplying opening 33. As the ion supplying opening 33 is connected to the gas inlet 13 in FIG. 4, the negative-ion rich gas 32 is fed to the separating member 19. FIG. 9 is a conceptual view illustrating a phenomenon which occurs in the interface when the negative-ion rich gas 32, in place of the gas in FIG. 6, is fed to the separating member 19.

As described above, the negative-ion rich gas 32 contains positive ions 35 and negative ions 36, but there are rather more negative ions 36 than the positive ions 35. Consequently, as is well known, when contacting with a conductive material, the negative-ion rich gas 32 gives negative charge even to an insulating material as well as to the conductive material. The separating member 19 that contacts with the negative-ion rich gas 32 is, therefore, negatively charged. On the other hand, on the solid phase-solution interface 22 between the separating member 19 and the processing solution 3, the same electrokinetic phenomenon as the above occurs, so that the heavy metal ions are attracted by the separating member 19 through a similar mechanism.

In this example, negative charge of the separating member 19 can be regulated by changing the output of the high-voltage DC power source 31, and even relatively low rate of the flow of the gas 21 can negatively charge the separating member 19. Furthermore, it is not necessary to consider a polarity on the basis of a triboelectric series when selecting materials for the separating member 19 and the gas 21.

In the process shown in Example 1 or 2, the filter is replaced with a new one when the filter becomes unable to adsorb the heavy metal ions. Alternatively, a positive-ion rich gas, in place of the gas for charging or the negative-ion rich gas, may be supplied to elute the heavy metal ions adsorbed on the surface of the separating member into the liquid phase, to permit the filter to be continuously used without change. It should be noted that such an operation should be carried out when product processing is discontinued, such as during a solution exchange, and the liquid containing the eluted heavy metal ions should be properly eliminated from the system by e.g., draining.

Next, the performance shown by a filter of the present invention will be described.

A mixture of hydrogen sulfide water and hydrogen peroxide water was used as a processing solution in a solution circulating type separator shown in FIG. 4 (hereinafter referred to as "the SPM processing solution"), and maintaining the temperature of the SPM processing solution at 140° C., the amounts of heavy metal ions contained in the SPM processing solution in the inner tank were determined before and after placing a filter equipped with a separating member negatively charged in the separator.

PFA resin, whose thickness and surface area were 1 to 2 mm and 0.6 $m^2$, respectively, was used as the separating member.

Evaluation was made by determining a recombination lifetime of minority carriers, which was correlated to the amounts of heavy metals attached to semiconductor wafers, by the use of a microwave detecting photoconductive attenuation method [See, Tsugio Shimono, Shin Morita, Yoshitoku Muramatsu and Mikio Tsuji, "Urutorakuriningu Tekunolozi (Ultracleaning Technology)", Vol. 3, p. 244–249 (1991)].

The minority carrier recombination lifetime of the semiconductor wafers oxidized without being treated with an SPM processing solution in the inner tank was selected as a reference value, and the minority carrier recombination lifetimes of the semiconductor wafers treated with the SPM processing solution in the inner tank before oxidation were determined before and after placing the filter. In FIG. 10, ratios 57 and 58 are the minority carrier recombination lifetimes obtained before and after placing the filter to the reference value, respectively.

As seen in FIG. 10, the ratio 58 of the minority carrier recombination lifetime of the semiconductor wafers treated with the SPM processing solution before the installation of the filter to the reference value was about 10%, whereas the ratio 57 of the minority carrier recombination lifetime of the semiconductor wafers treated with the SPM processing solution after the installation of the filter to the reference value was about 100%. Therefore, it is apparent that when the SPM processing solution treated with the filter of the present invention is used, heavy metals do not adhere to the semiconductor wafers.

That is to say, it has been substantiated that the heavy metal ions in the SPM processing solution can be removed by the filter in which the separating member is negatively charged.

As described above, in a filter of the present invention, a separating member comprises materials excellent in chemical resistance and heat resistance such as fluororesins, and therefore, the contamination of the processing solution with reaction products and chemical species eluted from the separating member itself can be prevented.

Furthermore, by utilizing an electrokinetic phenomenon, which occurs on a solid phase-solution interface between the negatively charged separating member and the processing solution by a gas that forces the separating member to be negatively charged or a negative-ion rich gas, the heavy metal ions positively charged in the processing solution can be attracted and trapped in the vicinity of the separating member, so that the heavy metal ions can be removed from the processing solution. Accordingly, the filter of the present invention can be applied to any solution used in a wet chemical processing of a semiconductor manufacturing process. In consequence, the contamination of the semiconductor wafers with the heavy metals in the processing solution can be prevented, resulting in eliminating defective semiconductor devices.

What is claimed is:

1. A method for removing heavy metal ions dissolved in a solution, comprising the steps of:
    (a) feeding the solution to a solution inlet of a filter, wherein the filter comprises:
        a container;
        a separating member dividing the container into two discrete chambers, the separating member adapted to attract heavy metal ions in the solution;
        the solution inlet adapted to pass the solution containing the heavy metal ions to be removed through one of the two chambers;
        a solution outlet adapted to discharge the solution pausing through the one chamber;
        a gas inlet adapted to pass a gas through the other of the two chambers;
        a gas outlet adapted to discharge the gas passing through the other chamber;
    (b) negatively charging the separating member by feeding the gas through the other chamber; and
    (c) attracting heavy metal ions in the solution passing through the one chamber to a surface of the negatively charged separating member in contact with the solution to remove the heavy metal ions from the solution.

2. A method according to claim 1, wherein the one chamber forms an inner cylindrical portion and the other chamber forms an outer annular portion, which is concentrically arranged outside the inner portion, wherein the solution flows through the inner portion and the gas flows through the outer portion.

3. A method according to claim 2, wherein the gas flows in one direction and the solution flows in an opposite direction.

4. A method according to claim 1, wherein the gas for negatively charging the separating member is selected from the group consisting of nitrogen, dry air, argon, and helium.

5. A method according to claim 1, wherein the gas for negatively charging the separating member is a negative-ion containing gas.

6. A method according to claim 1, wherein the separating member is comprised of a material that does not elute chemical species into the solution and is heat resistant sufficient to withstand the temperature of the solution.

7. A method according to claim 6, wherein the separating member comprises fluororesins selected from the group consisting of polytetrafluoroethylene, tetrafluoroethylene-perfluoroalkylvinyl ether copolymer, tetrafluoroethylene-hexafluoropropylene copolymer, tetrafluoroethylene-ethylene copolymer, polyvinylidene fluoride, polychlorotrifluoroethylene.

8. A method according to claim 1, wherein the solution is used for wet chemical processing of semiconductor wafers in a semiconductor manufacturing process.

9. A method according to claim 8, wherein the solution outlet is connected to a processing tank for subjecting semiconductor wafers to the wet chemical processing.

* * * * *